Dec. 27, 1955    H. E. SKIBITZKE    2,728,225
THERMAL FLOWMETER
Filed March 12, 1953    2 Sheets-Sheet 1
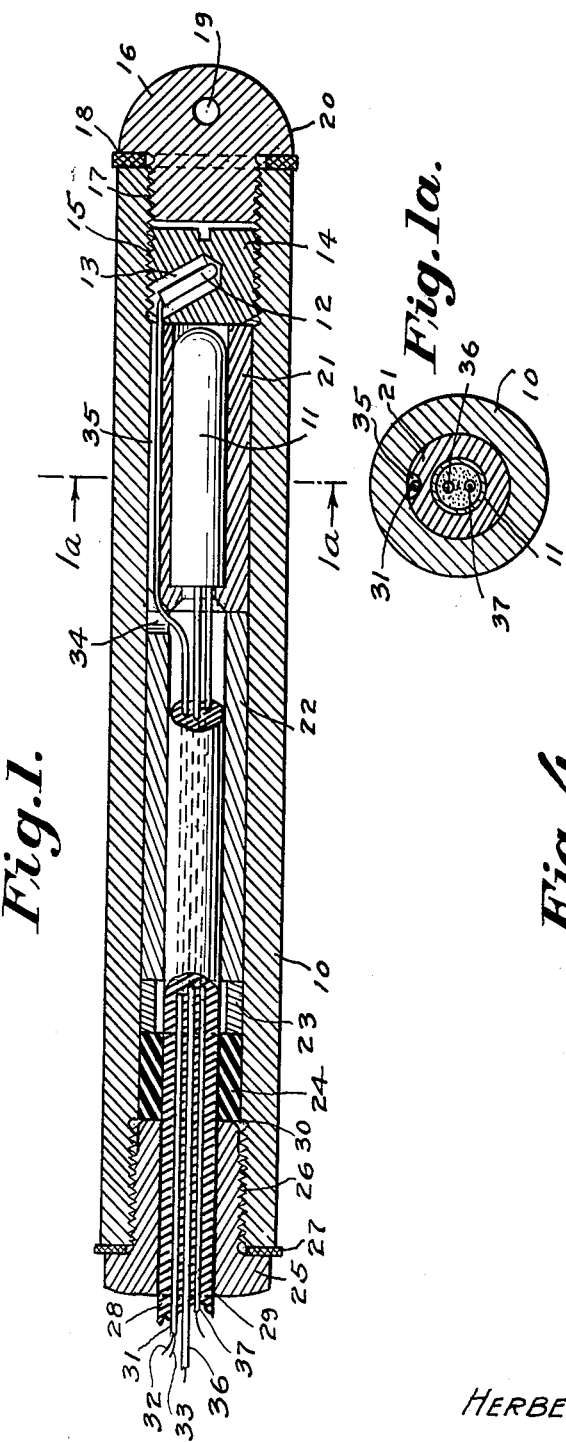
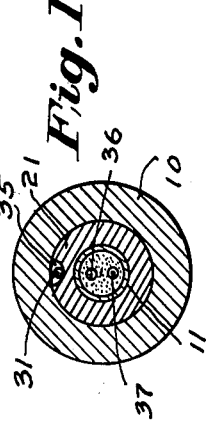
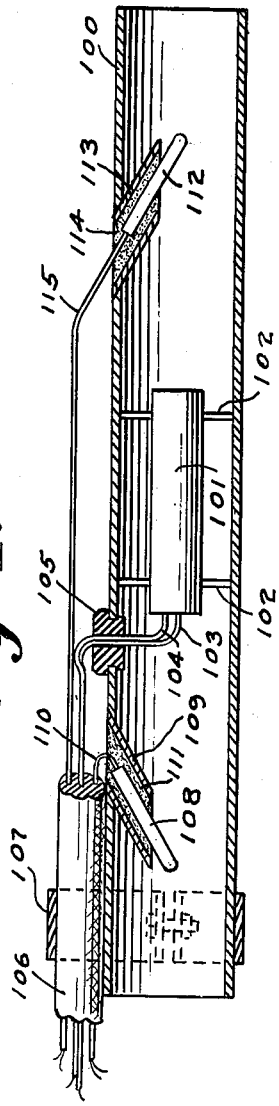
INVENTOR
HERBERT E. SKIBITZKE
BY
ATTORNEY Dec. 27, 1955  H. E. SKIBITZKE  2,728,225
THERMAL FLOWMETER
Filed March 12, 1953  2 Sheets-Sheet 2

INVENTOR
HERBERT E. SKIBITZKE
BY
H. L. Godfrey
ATTORNEY

United States Patent Office 2,728,225
Patented Dec. 27, 1955

2,728,225

THERMAL FLOWMETER

Herbert E. Skibitzke, Phoenix, Ariz.

Application March 12, 1953, Serial No. 342,040

2 Claims. (Cl. 73—204)

(Granted under Title 35, U. S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to apparatus for the measurement of fluid flow, and particularly relates to fluid flow measuring devices utilizing thermally sensitive resistance elements and adapted to be lowered into well bores, casings and the like.

Many difficulties have been encountered in attempting to log the fluid flow in wells with the devices heretofore available. Some of these devices are so large and contain so much auxiliary equipment that they cannot be lowered through small openings and are totally unsuitable for use in pumping wells where clearances may be as small as one inch.

Recently, a small thermally sensitive resistor element of the semi-conductor type known to the trade as a "thermistor" has been employed in flow indicators. An electrical current may be passed through such an element at a constant voltage whereby it is heated to a temperature higher than ambient temperature. The rate of heat dissipation from the element and accordingly the temperature attained by the resistance element is proportional to the velocity of flow of fluid past the element. The change in current flowing in the circuit as the resistance of the thermally sensitive element changes with temperature may be used as a measure of flow velocity. However, such a device is limited to the measurement of flow over a small velocity range and usually is suitable for measurement of low velocities only. It is necessary to employ a comparatively high constant voltage to obtain measurable variations in the high velocity range. With this high voltage a large change in resistance due to a sharp drop in the velocity of fluid flow may cause the sensitive thermal element to be damaged. Moreover, the characteristics of the resistance element may change over a wide velocity range and correspondingly wide current range. At low values of current Ohm's law is generally obeyed by thermistor elements, whereas at higher currents they may depart from Ohm's law, thus introducing the possibility of error in the interpretation of readings of the measuring instruments.

An object of this invention is to provide an apparatus of the type described which is adapted to be used over a wide range of velocities of fluid flow.

Another object of this invention is to provide apparatus for measuring fluid flow having a flow-sensitive element which may be lowered into a pumping well between the pump bowls and the well casing or wall, and which is especially adapted to measure the high velocities found in pumped wells.

Another object of this invention is to provide an apparatus for measuring fluid flow whereby a continuous log of fluid flow past a given point in a well bore or throughout the entire depth of the well bore may be recorded.

Another object of this invention is to provide an apparatus for measuring fluid flow whereby the velocity and the direction of fluid flow may be quickly and accurately determined.

Another object of the invention is to provide fluid flow measuring apparatus employing an electrical resistance element commonly known as a "thermistor," in combination with other elements whereby the apparatus is adapted to accurately measure high as well as low rates of fluid flow and whereby such small electrical currents flow through the thermistor that there is no danger of damage ot this element.

Other objects and advantages of the invention will become apparent from the following description thereof taken in connection with the accompanying drawings, in which:

Figure 1 is a longitudinal sectional view of one form of thermally sensitive proble unit adapted to be lowered into a well bore.

Figure 1A is a cross-sectional view taken on the line 1A—1A of Figure 1.

Figure 4 is a longitudinal sectional view of another embodiment of the invention and shows a thermally sensitive probe unit which is adapted to measure both the direction and the velocity of flow.

Figure 3:
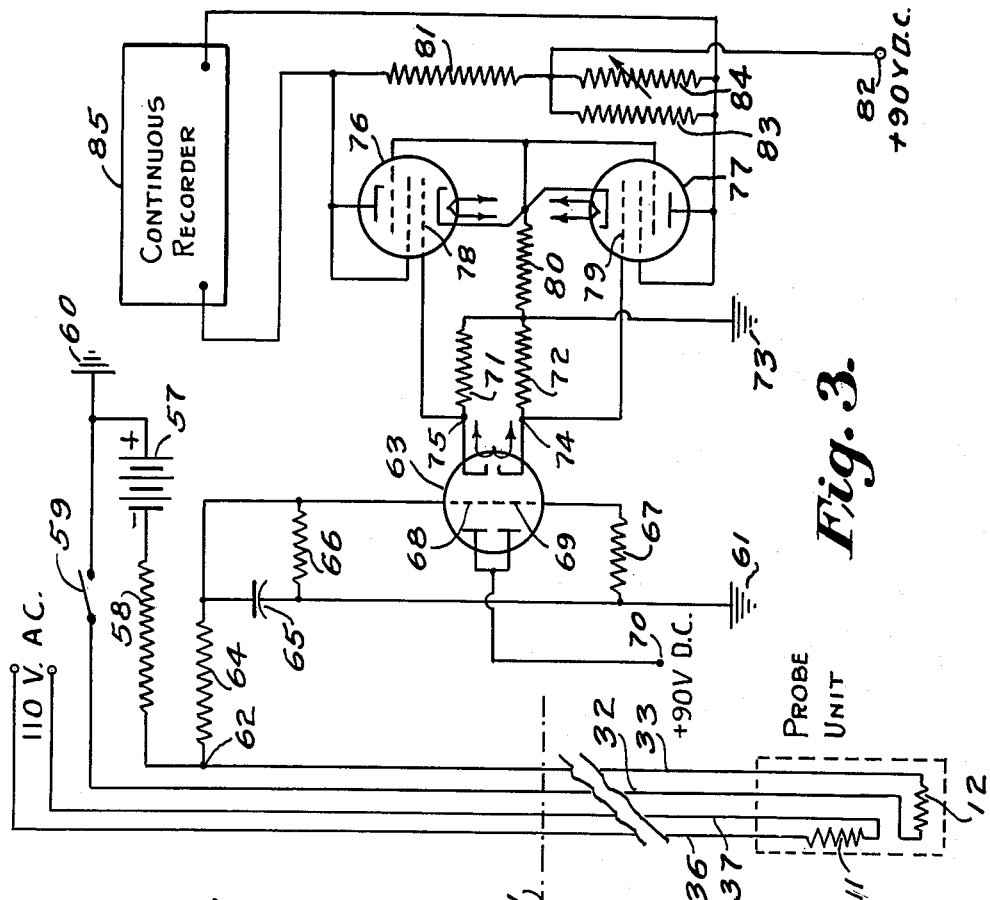
Figure 3 is a schematic electrical wiring diagram of a circuit adapted to be employed for the continuous recording of fluid flow in response to signals from the thermally sensitive unit of Figure 1.

The apparatus of this invention, in one embodiment thereof, comprises a small thermally sensitive unit, designated herein as a probe unit, which is adapted to be lowered into a well bore by means of a long cable. The probe unit contains a thermally sensitive element of the semi-conductor type known to the trade as a "thermistor," and a separate resistance heating unit. The cable attached to the probe unit carries electrical conductors for providing electrical energy to the thermistor and to the heating element from suitable sources of power at the surface of the ground. The electrical circuit including the thermistor is connected to measuring and indicating means capable of operating with such a small amount of current flowing that there is no appreciable heating of the thermistor element.

Referring now to Figures 1 and 1A, which illustrate a probe unit suitable for the purposes of this invention, a housing is shown at 10 for heating element 11 and thermistor 12. The housing 10 may be cylindrical, as shown, or may be of any other convenient shape. It may be made of brass or other suitable material. Preferably the housing 10 is of very small size so that it may pass through small clearances, as between the bowls of a pump and the wall or casing of a well. For example, the housing may be about ⅝ inch in diameter and several inches in length.

The thermistor 12, which may, for example, be a type 14a Western Electric unit having the form of a small capsule, as shown, is contained within cavity 13 of a cylindrical metal block 14 which threadedly engages the bore of the housing 10 as at 15. The forward end of the housing is closed by plug 16 which threadedly engages the housing bore at 17. A washer 18 of lead or other sealing material provides a water tight seal for the forward end of the housing. Means, such as hole 19, are provided in plug 16 for insertion of a tool therethrough whereby the plug may be drawn tight. The hole 19 also permits weights to be attached to the probe unit when it is necessary to add weight to stabilize the probe unit in a well flowing at high velocity. The plug 16 may be rounded as shown at 29 in order to facilitate its entrance into small openings.

The heating element 11 which may, for example, be a Model 500, 1A, 30 watt Regan resistance heater is contained within a sleeve 21 which also fits tightly within the bore of housing 10. This element may also be of cylindrical shape as shown. It is understood that the element 11 may comprise a coil of resistance wire, such as nichrome wire insulated within a metal housing. A sleeve 22 holds heating element 11 and sleeve 21 within the housing 10 and is in turn secured by means of ring 23, rubber gasket 24, and plug 25 which threadedly engages the housing 10 at 26. A washer 27 may also be provided at this end of the assembly.

A cable 28 which may be, for example, several thousand feet in length carries the electrical conductors for heating element 11 and thermistor 12. The end of this cable is inserted into the housing 10 through a suitable opening 29 in plug 25. Rubber gasket 24 holds the cable secure within the housing and forms a water tight seal due to pressure applied between ring 23 and the forward end 30 of the plug 25 when this plug is drawn tight. This cable carries a lead 31 which is connected to the thermistor 12. It is understood that lead 31 may contain two wires as shown at 32 and 33. Alternatively, one wire from thermistor 12 could be grounded to the metal block 14 of the probe unit. The circuit will be further described hereinafter in connection with Figures 2 and 3. The sleeve 22 is provided with an opening 34 which communicates with a slot 35 in sleeve 21 whereby the lead 31 may by-pass the heating unit 11 and make connection with thermistor 12. The cable 28 also carries leads 36 and 37 which connect with the resistance coil within heating element 11.

Figure 2:
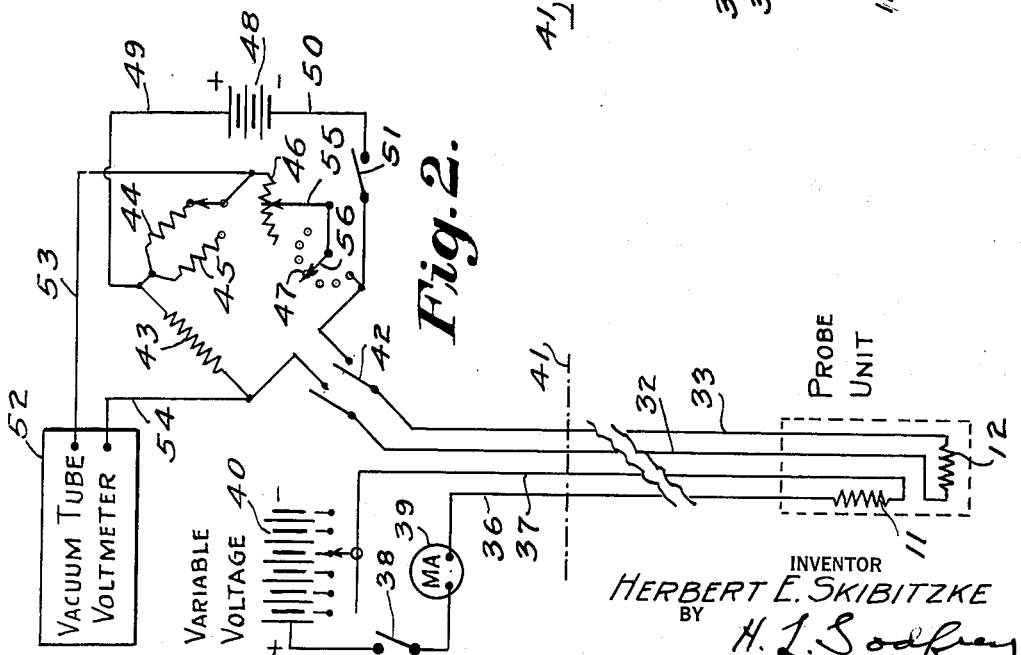
Figure 2 is a schematic electrical wiring diagram showing a measuring circuit which may be employed with the thermally sensitive unit of Figure 1.

Referring now to the circuit diagram of Figure 2, the heating unit 11 is shown to be connected through leads 36 and 37, switch 38 and milliammeter 39 to a variable voltage source 40. It is understood that the latter units would be located at the surface of the ground represented by broken line 41, and that the leads may be in several thousand feet of cable as the case may be. The variable voltage source may be in the form of a battery composed of a number of cells which may be selectively connected in the circuit, as shown, or may be provided from portable generators, or from a permanent source having suitable means for varying the voltage. Means for varying the voltage through a range of, for example, 10 to 150 volts may suitably be used. By adding or substracting voltage, it is possible to find a heat range suitable for the particular water velocities involved. Thus, in logging a well which is not being pumped and in which relatively low velocities are encountered, a relatively low voltage may be applied across the heating unit, whereas in logging high velocity or pumping wells a higher voltage may be used. The heating unit may suitably have a resistance in the 250 to 300 ohm range.

In order to avoid heating the thermistor 12 with the measuring circuit, it is necessary to use some means operating upon very small currents. In the modification shown in Figure 2, this is accomplished by use of a Wheatstone bridge unit at the ground level in which a vacuum tube voltmeter replaces the usual galvanometer. Thermistor 12 in the probe unit forms one leg of the Wheatstone bridge, and is connected thereto by means of leads 32 and 33 and switch 42. Resistance 43 forms a second leg of the bridge, one of resistances 44 and 45 forms a third leg, and slide wire resistance 46 and decade unit 47 form the fourth leg. A small direct current is provided across the bridge by means of battery 48 through leads 49 and 50 and switch 51. A suitable vacuum tube voltmeter 52 is connected across the opposite end of the bridge by means of leads 53 and 54.

The resistor 43 acts as the standard resistance to be balanced. Resistors 44 and 45 act as multipliers, slide wire resistor 46 and decade unit 47 measure the resistance of the thermistor multiplied by the factor of the setting of resistances 44 and 45. For example, when the vacuum tube voltmeter 52 reads zero, the position of the indicator arms 55 and 56 give the resistance of the thermistor. Thus, a very accurate determination of this resistance may be made. Satisfactory operation may be obtained with the battery 48 supplying 22½ volts, a resistance 43 of 1 megohm, resistance 44 of 10,000 ohms and resistance 45 of 1 megohm, slide wire resistance 46 of 10,000 ohm range, and a decade unit 47 having 10,000 ohm steps. At the low values of current in the thermistor circuit, Ohm's law is obeyed by the thermistor resistance.

In the operation of this embodiment of the invention, the probe unit is lowered the desired distance into the well and is then stopped. The switch 38 is closed completing the circuit to the heating element. After equilibrium has been reached with the voltage through the heating unit adjusted to the desired value, the switches 42 and 51 in the thermistor circuit are closed, and the resistances 46 and 47 are varied until the vacuum tube voltmeter 52 reads zero. The thermistor resistance as indicated by the position of indicator arms 55 and 56 is recorded for this point. The probe unit may be left at this position in the well and checked periodically at spaced time intervals in order to log the change in velocities at this point with respect to time, or it may be lowered another increment of distance into the well in order to obtain a velocity-depth log. The rate of heat dissipation from the unit and consequently the temperature of the thermistor and thermistor resistance changes in proportion to velocity changes. Thus, migh high velocity the rate of heat dissipation is high and the temperature of the thermistor element is correspondingly low. The resistance of the thermistor therefore increases at higher velocities of flow. However, with the device of this invention the thermistor element never carries sufficient current to damage it since it does not have to serve as both a heating and measuring means.

Another modification of the measuring circuit is shown in Figure 3. This circuit is particularly adapted for continuous recording of changes of resistance in the thermistor 12 whereby continuous logging of a well may be accomplished. The heater 11 is shown connected by leads 36 and 37 to a 110 v. A. C. power source above the ground level 41. It is to be understood that a variable power source as in the circuit of Figure 2 may also be used. Leads 32 and 33 in the thermistor circuit connect thermistor 12 to a direct current source such as battery 57. Current flow from battery 57 through the thermistor 12 is limited by means of resistance 58 which is large compared to the resistance of the thermistor so that the effect of changes of resistance in this unit upon the circuit are small. For example, the battery 57 may supply 45 volts, the resistance 58 may be 750,000 ohms and the thermistor may have a resistance of several thousand ohms at the temperature involved. At the small values of current employed, Ohm's law is obeyed by the thermistor. The thermistor circuit also includes switch 59 and ground 60.

In order to measure the small changes in resistance of the thermistor 12, the voltage drop across the thermistor is applied between ground 61 and a point 62 and is utilized to control the grid potential of a first stage difference amplifier tube 63. Current limiting resistance 64 prevents overloading of the tube circuit. Alternating current components are removed from the circuit by means of condenser 65 connected to ground 61. By use of a suitable resistance 66 the grid potentials of grids 68 and 69 are unbalanced when current is flowing in the circuit. The potential of grid 69 is fixed by means of a suitable resistance 67, but the potential of grid 68 changes as the current changes across resistance 66.

The amplifier tube 63 is provided with a suitable plate current from a source 70 which may provide 90 v. D. C., as shown, and a circuit is completed through tube 63 and resistances 71 and 72 to ground at 73. The voltage level at point 74 remains substantially constant, but the voltage level at point 75 varies in response to variations of the potential of the grid 68. By means of vacuum tubes 76 and 77 controlled by grids 78 and 79 the differences in these voltages are amplified. Grid biasing resistor 80 raises the level of grids 78 and 79 to the same point as at 74 and 75.

A circuit is completed from ground 73 through biasing resistor 80, tube 76 and resistance 81 to positive terminal 82. A similar circuit is completed through tube 77 and parallel resistances 83 and 84 to positive terminal 82. The resistance 84 is variable in order to provide means for adjustment to compensate for slight differences in tube characteristics. The voltage drop across resistances 83 and 84 is substantially constant, whereas, the voltage drop across resistance 81 is variable depending upon the current from tube 76. A continuous recording milliammeter 85 is connected across the plates of tubes 76 and 77. As the voltages change across resistance 81 the milliammeter records the change. This recording is directly proportioned to changes in the resistance of the thermistor 12. An O-1 MA Esterline Augus Recorder has been found suitable as a recording instrument in this circuit. It will be understood, however, that any continuous recording instrument of similar function may be used.

The use of a heating unit separate from the thermister as in the probe unit of this invention gives a nearly linear relationship between the velocity of the water and the resistance of the thermistor. It is to be understood that the instrument may be calibrated with respect to known velocities of flow so that the actual velocity of flow, as well as the relative velocity, may be determined from the recordings made. The heating element in the probe is relatively rugged and is substantially unaffected by the change in heat dissipation rate due to changes in flow velocities encountered. The thermistor element is subjected to a current flow of only a few milliamperes over the entire range of velocities, which may, for example, include velocities encountered in a well flowing at a rate of 4,000 gallons per minute in a 16-inch bore.

Since the resistance of the thermistor varies with the ambient temperature, the unit may also be employed to measure the temperature at various positions in the well bore. In such use, it is not necessary to pass an electrical current through the heating element. Either of the circuits of Figures 2 and 3 may be used to determine the thermistor resistance.

In the modification of the invention shown in Figure 4, a probe unit is provided which measures the velocity of fluid flow and also indicates the direction of flow. This unit consists of a small hollow tube 100 containing a cylindrical heating element 101, of smaller diameter, supported by suitable means as shown at 102. Insulated electrical conductors 103 and 104 for heater 101 pass through an opening in the outer tube 100 and are further insulated from the metal thereof by insulated plug 105. The conductors are carried by a suitable length of cable 106 which may be clamped to the probe unit by clamp 107, as shown, or otherwise suitably affixed. In this device two thermistors are employed, one on each side of the heating unit. Thus, thermistor 108 is positioned within a bushing, nipple, or the like, 109 so that its tip projects into the stream of fluid flowing in the tube 100. Line 110 connects the thermistor through cable 106 to a measuring circuit. It will be understood that line 110 is insulated and may carry two conductors. Water proof plastic material 111 holds the thermistor 108 firmly within the bushing 109 and also provides a water proof seal for the electrical connections. On the other side of the heating element 101, another thermistor 112 is similarly held within a bushing 113 by water proof plastic 114. Insulated line 115, containing two conductors, connect this thermistor through cable 106 to a suitable measuring circuit.

The principle of operation of the directional probe is similar to that of the nondirectional probe previously described, except that two thermistors and a hollow tube are employed. By using the hollow tube, only one component of motion of the surrounding fluid stream affects the rate of heat dissipation. A small quantity of fluid flows through the tube in a direction of the general flow of surrounding fluid. The fluid flowing within the tube is heated as it passes over the heating unit and its temperature will vary inversely with its velocity of flow. Thus, the resistance of one of the thermistors will drop because of the increase in temperature of the fluid flowing by it over the heater and the thermistor measuring circuits will register different resistances. By observing which thermistor resistance is the lowest, the direction of flow can be ascertained. The change in resistance of the changing element can be rated to indicate the velocity of flow as in the nondirectional probe unit described above. For example, if the fluid flow is through the hollow tube 100 from left to right, the temperature of the fluid at the thermistor 112 will be higher than that at thermistor 108. For increasing velocity in this direction, the temperature of the fluid will decrease and the measuring circuit will indicate the change.

It is understood that the thermistors in the directional type probe may be individually connected to measuring circuits such as illustrated in Figures 2 and 3. By use of a suitable switch, the Wheatstone bridge of Figure 2 could be connected first to one thermistor and then to the other. Continuous recording circuits may also be utilized that measure differences between the resistances of the two thermistors, and this difference may be rated in terms of velocity.

While the flow measuring apparatus of this invention may be utilized for measuring the flow of many types of fluids, in wells, pipes, streams, and the like, it is particularly advantageous in the measurement of water velocities in deep wells. The small size of the probe unit permits it to be lowered into an operating well between the pump column and bowls and the well casing, without removing the pump and, if desired, while the pump is running. The probe is cheap, simple, and easy to construct and therefore may be considered expendable. It is highly accurate even over the wide ranges of water velocities found in pumping wells.

It will be appreciated from a reading of the foregoing specification that the invention herein described is susceptible of various changes and modifications without departing from the spirit and scope thereof.

What is claimed is:

1. A meter for measuring velocity of fluid flowing past the meter, comprising a heat conductive metallic tubular casing closed at both ends to form a housing impervious to the fluid, a heating element including a resistance coil disposed within the housing in thermal contact therewith whereby the heat is conducted from the heating element to the housing and from the housing to the fluid at a rate proportionate to the velocity of flow of the fluid around the housing, a thermally sensitive resistor disposed in a metallic block within the housing in spaced relation to the heating element and in thermal contact with the housing and heating element, an electric circuit passing from the heating element exteriorly through one end of the housing to generate heat at the desired rate, an electric circuit extending from the thermally sensitive resistor exteriorly through said end of the housing to a source of fixed voltage adapted to cause flow of a current of electricity too small to substantially heat the thermally sensitive resistor, and means for indicating the resulting small changes of resistance of the thermally sensitive resistor whereby changes in the velocity of fluid around the housing are observed.

2. A meter for measuring velocity of fluid flowing past the meter, comprising a heat conductive metallic tubular casing closed at both ends to form a housing impervious to the fluid, a heating element including a resistance coil disposed within the housing, a tubular sleeve of heat conductive material interposed between the heating element and the housing to conduct heat from the heating element to the housing whereby the heat is conducted away from the housing at a rate proportionate to the velocity of flow of the fluid around the housing, a metallic block within the housing in thermal contact therewith and with the adjoining end of the sleeve and having a cavity opening toward the sleeve, the sleeve having a slot communicating with the cavity and with the bore of the sleeve, a thermally sensitive resistor disposed within the cavity, an electric circuit passing from the heating element through the bore of the sleeve and exteriorly through one end of the housing to generate heat at the desired rate, an electric circuit extending from the thermally sensitive resistor through the slot into the bore of the sleeve and exteriorly through said end of the housing to a source of fixed voltage adapted to cause flow of a current of electricity too small to substantially heat the thermally sensitive resistor, and means for indicating the resulting small changes of resistance of the thermally sensitive resistor whereby changes in the velocity of flow of fluid around the housing are observed.

References Cited in the file of this patent

UNITED STATES PATENTS

| | | |
|---|---|---|
| 2,377,884 | Hillman | June 12, 1945 |
| 2,509,889 | Shockley | May 30, 1950 |
| 2,580,182 | Morgan et al. | Dec. 25, 1951 |
| 2,583,561 | General et al. | Jan. 29, 1952 |

OTHER REFERENCES

Thermistors, Their Characteristics and Uses, G. L. Pearson, Bell Laboratories Record, December 1940, pp. 106–111.

Serial No. 342,488, Martienssen (A. P. C.), published May 4, 1943.